US008051108B2

(12) United States Patent
Gebben et al.

(10) Patent No.: US 8,051,108 B2
(45) Date of Patent: Nov. 1, 2011

(54) SYNCHRONIZATION OF DATA ON SURVEY DEVICES

(75) Inventors: Charles V. Gebben, Westminster, CO (US); Gregory A. Kessinger, Highlands Ranch, CO (US); Gary D. Lantaff, Westminster, CO (US); Quan E. Mueller, Westminster, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 445 days.

(21) Appl. No.: 12/190,141

(22) Filed: Aug. 12, 2008

(65) Prior Publication Data

US 2009/0243921 A1 Oct. 1, 2009

Related U.S. Application Data

(60) Provisional application No. 61/041,559, filed on Apr. 1, 2008.

(51) Int. Cl.
*G06F 17/30* (2006.01)
*G01S 1/00* (2006.01)
(52) U.S. Cl. .............. 707/809; 707/812; 342/357.06
(58) Field of Classification Search ............ 707/809
See application file for complete search history.

(56) References Cited

U.S. PATENT DOCUMENTS

| 7,647,346 B2 * | 1/2010 | Silverman et al. ...... 707/999.107 |
| 2003/0018507 A1 * | 1/2003 | Flanagan ............................. 705/8 |
| 2005/0021388 A1 * | 1/2005 | Hatcher et al. .................. 705/10 |
| 2005/0171790 A1 * | 8/2005 | Blackmon ........................ 705/1 |
| 2007/0106784 A1 * | 5/2007 | Dickman ...................... 709/224 |
| 2007/0220552 A1 * | 9/2007 | Juster et al. ..................... 725/46 |
| 2007/0233542 A1 * | 10/2007 | Dubreuil et al. ................ 705/8 |
| 2008/0162041 A1 * | 7/2008 | Nakamura ..................... 701/209 |
| 2009/0210277 A1 * | 8/2009 | Hardin et al. ................... 705/8 |
| 2009/0319068 A1 * | 12/2009 | Sager ............................. 700/98 |
| 2010/0026551 A1 * | 2/2010 | Szwilski et al. ................ 342/22 |

\* cited by examiner

*Primary Examiner* — Don Wong
*Assistant Examiner* — Binh V Ho
(74) *Attorney, Agent, or Firm* — Kilpatrick Townsend & Stockton LLP

(57) ABSTRACT

Tools for synchronizing survey data between one or more survey devices and a surveying office application. The disclosed tools can help to ensure that each of the devices, and the office application, have consistent data. An exemplary tool might detect a change to data in an office application, identify any affected files on one or more survey devices, and ensure that the affected files are updated with the appropriate information. Conversely, in other aspects, a data inconsistency (which might be caused by a data change in the office application and/or on one or more of the survey devices) might be detected, and tools might be provided to enable a user to ensure that the correct version of the data is maintained by the system.

19 Claims, 9 Drawing Sheets

SYNCHRONIZATION OF DATA ON SURVEY DEVICES

CROSS-REFERENCES TO RELATED APPLICATIONS

This application is a nonprovisional application claiming the benefit, under 35 U.S.C. §119(e), of provisional U.S. Pat. App. No. 61/041,559, filed Apr. 1, 2008 by Charles V. Gebben et al. and entitled "Synchronization of Data on Survey Devices," the entire disclosure of which is hereby incorporated herein by reference for all purposes.

This application is also related to U.S. patent application Ser. No. 12/190,153, filed on a date even herewith by Charles V. Gebben et al. and entitled "Merging Data From Survey Devices," the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

In virtually every construction or public works project, surveying is used to map the area for the project, identifying with relative precision the locations of geological and other topographic features, elements of the project, and the like. Traditionally, these surveying tasks were performed manually, using transits and the like to measure distances, elevations, angles, etc.; this data was then recorded by hand by a surveyor and later used to produce maps and other documents.

More recently, surveyors have begun to use more sophisticated tools, which can include features like global positioning system ("GPS") receivers, radio transmitters, computers, and the like to facilitate the measurement and recording of data. These tools (generally referred to herein as "survey devices") can have a range of features and abilities, but generally they share the ability to record measurements electronically. Typical examples of survey devices include, but are not limited to, the Trimble R8™ Global Navigation Satellite System ("GNSS"), the Trimble R7™ GNSS, the Trimble R6™ and R3™ GPS systems, the Trimble 5700™ and 5800™ GPS receivers, and the Trimble TCS2™, CU™, ACU™ and Recon™ controllers, all commercially available from Trimble Navigation Limited. Other examples of survey devices can include virtually any device that is capable of measuring and/or recording data.

These electronically-recorded measurements from a survey device can then be used by an engineer (or other operator) as input to a surveying office application (or, for that matter, any other type of application that is designed to utilize such data). Such applications often include features similar to those provided by computer-aided design ("CAD") programs, and can allow a user to design a project. (Alternatively, a surveying office application might be used to perform the original site layout, at which point the layout can be exported to a traditional design application for the design of the project.) One example of a surveying office application is the Trimble Business Center™, commercially available from Trimble Navigation Limited. The surveying data recorded by the survey devices, then, can be used to ensure that the project design is consistent with the reality of the site for which the project is planned.

Traditionally, the process of communicating data between survey devices and surveying office applications has been a relatively manual, error-prone process. This creates several issues. First, this type of process is relatively inefficient. Second, in many applications, the fidelity of the survey data is of paramount importance, and errors introduced by the data communication process can present severe challenges to the successful completion of a project.

As a complicating factor, in many cases, multiple survey devices may be used for a single project, further exacerbating the issue of data consistency. Generally, it is important for each survey device to have consistent data; using a manual data synchronization process, it is difficult to ensure that all devices (and the surveying office application) have consistent, up-to-date data. Moreover, there is a possibility that data will be changed, either intentionally or inadvertently, in the office application or on one or more of the devices. Traditionally, there has been no satisfactory way to determine which set of data is correct.

While other tools exist for synchronizing data between a personal computer and a handheld device, these tools generally are insufficient to meet the needs of users of surveying office applications. Merely by way of example, most synchronization tools typically only are configured to synchronize data between a personal computer and a single device, or if such tools do support more than one device, they cannot ensure data consistency between the devices themselves. Moreover, such tools have no facility for addressing the specific data requirements of surveying applications.

Hence, these issues and others have created a long-felt need for more robust tools for ensuring consistency of data between a surveying office application and one or more survey devices that operate with that office application.

BRIEF SUMMARY

Hence, certain embodiments of the invention provide tools for synchronizing survey data between one or more survey devices and a surveying office application. In accordance with some embodiments, these tools can help to ensure that each of the devices, and the office application, have consistent data. Hence, in some aspects, an embodiment might detect a change to data in an office application, identify any affected files on one or more survey devices, and ensure that the affected files are updated with the appropriate information. Conversely, in other aspects, an embodiment might detect a data inconsistency (which might be caused by a data change in the office application and/or on one or more of the survey devices) and provide tools to enable a user to ensure that the correct version of the data is maintained by the system.

The tools provided by various embodiments of the invention include, without limitation, methods, systems, and/or software products. Mainly by way of example, a method might comprise one or more procedures, any or all of which can be executed by a computer system. Correspondingly, an embodiment might provide a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

Merely by way of example, one set of embodiments provides methods, including without limitation methods of providing consistent data across a plurality of survey devices and/or an associated office application. One exemplary method comprises managing, with a computer system, a database for storing surveying data. The method, in some embodiments, further comprises storing, in the database, a dataset about a surveying project. The method might also include managing, with the computer system, a plurality of sets of one or more files stored in a file system accessible by the computer system. Each set of one or more files might correspond to at least a portion of the dataset, and/or the plurality of sets of one or more files might comprise a first set of one or more files and a second set of one or more files.

In some embodiments, then, the method further comprises transferring, from the file system, the first set of one or more files to a first survey device and/or transferring, from the file system, the second set of one or more files to a second survey device. Upon detecting, at the computer system, a change to the surveying project (the change comprising a change to some of the data in the dataset) the method might include determining, at the computer system, that the change to the surveying project affects at least one file in the first set of one or more files but does not affect any files in the second set of one or more files. The method, in a particular embodiment, might further include updating, in the file system, at least one file in the first set of one or more files with a replacement file and/or transferring, from the file system, at least the replacement file to the first survey device.

A method in accordance with another set of embodiments comprises managing a database for storing surveying data and/or storing, in the database, a dataset about a surveying project. In some embodiments, the method further comprises detecting a change to the surveying project, the change comprising a change to some of the data in the dataset. In a particular embodiment, the method comprises determining that the change to the surveying project affects data stored on a survey device and/or transferring replacement data to a survey device, the replacement data corresponding to the change to some of the data in the dataset.

Yet another method, in accordance with other embodiments, comprises managing, with a computer system, a database for storing surveying data and storing, in the database, a dataset about a surveying project. The method might also include managing, with the computer system, a first set of one or more device files stored on a first survey device and a second set of one or more device files stored on a second survey device. In some cases, the method further comprises comparing a first subset of data in the dataset with a second subset of data in the first set of one or more device files and a third subset of data in the second set of one or more device files. Based on this comparison, the method might also determine, that an inconsistency exists between one or more of the subsets of data. In such cases, the method can include identifying a proper subset of data among the subsets of data and/or updating one or more of the subsets of data to resolve the inconsistency.

Another set of embodiments provides computer systems. In accordance with one such embodiment, a computer system comprises a processor, a communication interface in communication with the processor, and a computer readable medium in communication with the processor. In this embodiment, the computer readable medium having encoded thereon a set of instructions executable by the computer system to perform one or more operations. Merely by way of example, the set of instructions might comprise instructions for performing one or more procedures of the methods described above.

Similarly, yet another embodiment provides an apparatus, which comprises a computer readable medium having encoded thereon a set of instructions executable by a computer system to perform one or more operations. Merely by way of example, the set of instructions might comprise instructions for performing one or more procedures of the methods described above.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

While various aspects and features of certain embodiments have been summarized above, the following detailed description illustrates some exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In an aspect, certain embodiments of the invention provide tools for synchronizing data in a surveying system. Beneficially, some of these embodiments provide tools to allow a user to update data in an office application, such as a surveying office application, and automatically determine which, of several, survey devices are affected by the update. The affected survey devices, in some embodiments, then can be updated automatically with the current data. Other embodiments beneficially provide tools for resolving data inconsistencies between a surveying office application and one or more devices, ensuring that the office application and the devices are all current with the necessary information.

Figure 1:
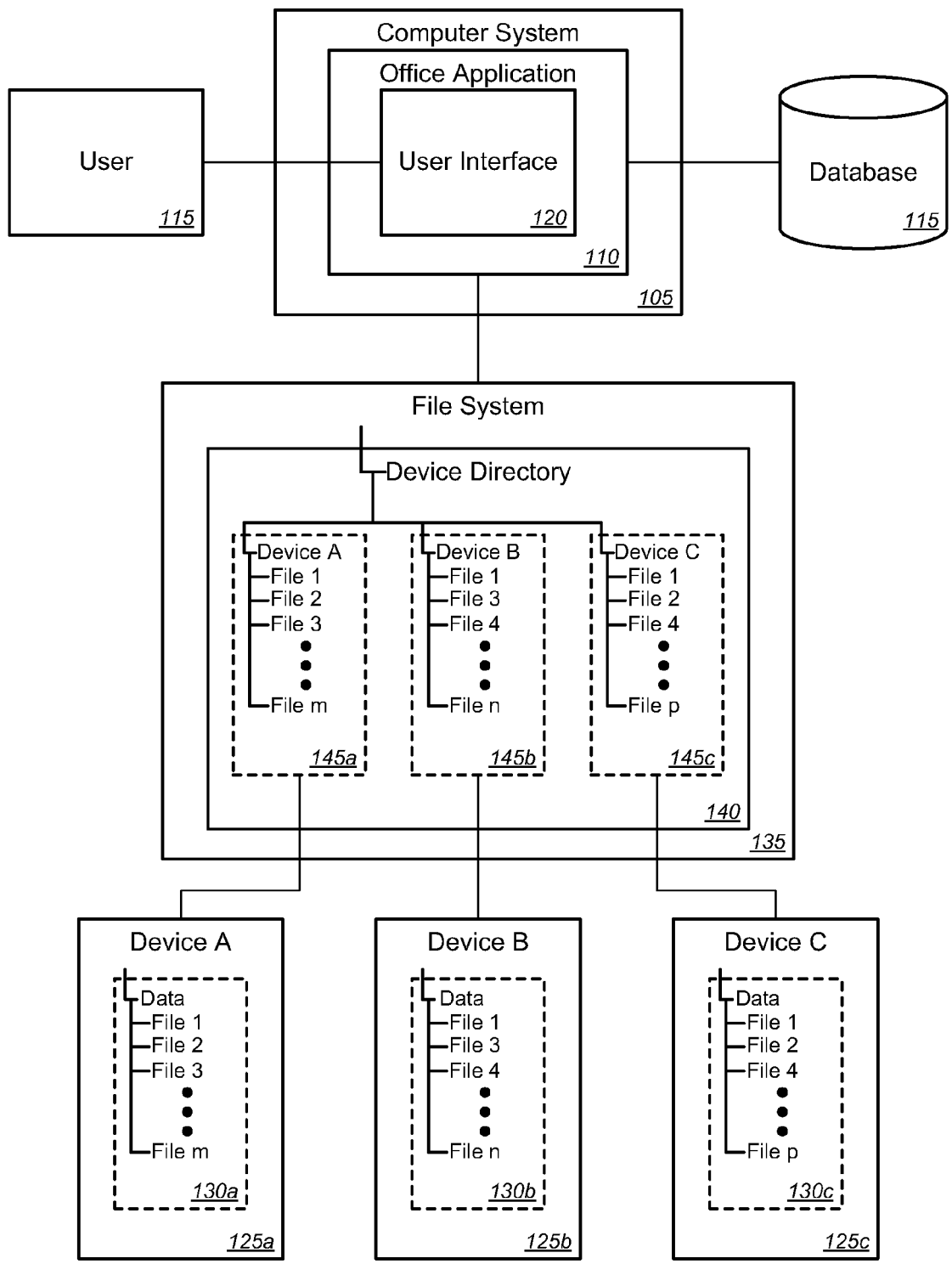
FIG. 1 is a block diagram illustrating a system for synchronizing data in a surveying system, in accordance with certain embodiments of the invention.

FIG. 1 illustrates a surveying system 100, or more precisely, the components of a surveying system that are involved with data synchronization, in accordance with one set of embodiments. It should be noted that the system 100 of FIG. 1 is illustrated functionally, in simplified format, to facilitate the description of certain functionality provided by various embodiments of the system 100. Various structural arrangements of the system 100 and/or its components are described in further detail below.

The system 100 of FIG. 1 includes a computer system 105, which executes an office application 110. In some aspects, the office application 110 provides much of the functionality of the system 100, and the office application 110 may comprise instructions executable by the computer system 105 to perform many of the methods (and/or one or more of the procedures thereof) described in further detail below. In one set of embodiments, the office application is a surveying office application, although other types of office applications may be used in accordance with various embodiments of the invention.

In a general aspect, the office application 110 may be used by a user to produce a surveying project and/or any other type of design project. In particular embodiments, the office application 110 allows the user to map a location associated with a particular surveying project. Accordingly, the office application 110 includes a user interface 120 to provide communication between the user and the application 110. The user interface may accept input via any of a variety of input devices (including without limitation those described in further detail below) incorporated by and/or in communication with the computer system 105, and/or produce output for the user via any of a variety of output devices (including without limitation those described in further detail below) incorporated by and/or in communication with the computer system 105.

Typically, the office application 110 will store data about a surveying project in a data store. In an exemplary embodiment, the data store comprises a database 115, which stores data (which can include reference points, angle values, triangle data, etc.) used by the office application to represent the site to which the surveying project pertains (or the object of a design project, etc.). Other types of data stores may be used, however.

The system 100 further includes one or more survey devices 125. (Although the system 100 is illustrated with three survey devices 125 for the sake of simplicity, it should be recognized that any number of survey devices 125 may be employed by various embodiments.) In an aspect of some embodiments, the survey devices 125 each share the same data (or at least a portion thereof) that is used by the office application 110 and/or stored in the database 115.

As noted above, it is often important for each of the survey devices 125 to have data that is consistent with that used by the office application 110. For example, the data that is collected by the survey devices 125 may be provided to the office application 110 to allow the user 115 to render an accurate depiction of the site that is the subject of the project. If the office application's 110 data is not consistent with that of the devices 125, this rendering will be imprecise and/or inaccurate, which can have dramatic adverse effects on the cost and/or success of the project itself.

Hence, a set of embodiments provides tools to enable the sharing of consistent data between various components of the system 100. Merely by way of example, in some embodiments, while the office application 110 stores its data in a database 115 (or other data store), the devices 125 each have a set of one or more files 130 that store the data used by each device 125. It is anticipated that each device 125 may not need to have all of the data used by the office application 110 (for example, if different devices 125a, 125b, 125c are used for different portions of the project, to collect data from different areas of the site, etc.). Hence a first device 125a might have a first set of one or more files 130a that comprise the data needed/collected by that device, while a second device 125b might have a second set of one or more files 130b that comprise the data needed/collected by that device, and a third device might have a third set of one or more files 130c. As illustrated by the filenames (e.g., File 1) depicted by FIG. 1, in many cases, there may be overlap in the respective files 130, and/or portions of the data therein, stored on each device 125.

The types of files stored on each device are discretionary, and often will depend on the nature of the devices 125, their functionality, and/or the nature of the project. Merely by way of example, in some embodiments, a device 125 might comprise one or more reference point files (which might, for instance, store ASCII or other textual data about reference points used by the office application 110 to render the depiction of the site). These reference points might be described, merely by way of example, by GPS coordinates, latitude/longitude/elevation values, and/or the like. A device 125 might also comprise one or more polygon files (referred to herein generically as "triangle files"), which store data about triangles (or other polygons) used to provide polygonal rendering of a particular site, model, etc., as is known in the art. Further, a device 125 might store other files used to describe a site, model, etc.; such files might have standard and/or proprietary formats—the standard drawing interchange format ("DXF") is one example of such a format. The files 130 on each device 125 are referred to herein as "device files," such that a particular device 125a will have a set of device files 130a specific to that device, which may or may not be identical to a set of device files 130b on another device 125b. Device files 130 may be stored by a device 125 using any of a variety of known techniques, e.g., by storing the device files 130 on a storage medium (such as those described below) within the device 125 or in communication with the device 125.

Because, in some embodiments, the office application 110 stores its data in a database 115, and the devices 125 store their respective data in file sets 130, the office application 110 (and/or a cooperative program) may be configured to track which data each device 125 needs and to export that specific data from the database 115 to the necessary files for the devices 125. One technique for accomplishing this is depicted by FIG. 1; other techniques are possible as well.

In accordance with the technique of FIG. 1, the office application 110 is configured to extract the respective data needed by each device 125 from the database 115 and store that data in a file system 135 that is accessible by the office application 105. This file system 135 may be formatted using any of several available formats (e.g., FAT, FAT32, NTFS, ReiserFS, EXT2, etc.) and/or a proprietary format. The file system 135 may be made accessible to the office application 105 by being stored on a computer readable medium (such as those described below) incorporated within the computer system 105, mounted by an operating system of the computer system 105, and/or otherwise placed in communication with the computer system 105.

In a set of embodiments, the file system 135 is configured with a directory structure 140 that establishes a separate directory for each set of files 145 needed by each respective device 125. The files 145, which are stored in a directory structure 140 maintained by the office application 110 (and/or a cooperative program) are referred to herein as "local files." Hence, in an embodiment, each device 125 will have a set of local files 145 that correspond to the device files 130 needed by that device 125. Specifically, the file system 135 will store a first set of local files 145*a* that correspond to a first set of device files 130*a* on a first device 125*a*, and so on.

While the synchronization of data between the office application 110 and the devices 125 is described in further detail below with respect to the methods depicted by FIGS. 2-5, in a general sense, data is synchronized by establishing communication between a device 125 and the file system 135. Once communication has been established, one or more files from the appropriate set of local files (e.g., 145*a*) are transferred to a device (e.g., 125*a*), where they are stored as corresponding device files (e.g., 130*a*), or vice-versa. As described in further detail below, certain embodiments provide tools to determine whether a file (or set of files) should be transferred to or from a device 125. In some cases, the devices may be in relatively constant (e.g., wireless) communication with the computer system 105 (and/or another device that serves as an intermediary between the file system 135 and the survey device 125), in which case, updated files are transferred relatively immediately.

In other cases, a survey device 125 may have only intermittent communication with the file system 135. Merely by way of example, each device may have a dock (or other wired or wireless connection to the computer system 105 or an intermediary device), such that the survey device 125 is only in communication with the file system 135 when docked. In that case, any updates may be queued to be transferred the next time the device 125 is docked. In a particular embodiment, a process running on the computer system 105 (or other intermediary device, such as another computer specifically configured to serve as a communication interface between the file system 135 and the devices 125) monitors the communication status of each device, and when communication is detected, checks to see whether any updates exist. Such processes can be implemented as daemons, cron jobs, Windows NT services, or using any other appropriate architecture, depending on the nature of the computer managing the communications.

While FIG. 1 describes a functional architecture of one embodiment of the invention, it should be appreciated that numerous variations are possible. Merely by way of example, the functions ascribed to the computer system 105 may be divided among multiple computer systems; similarly, the functions ascribed to the office application 110 may be divided among multiple applications and other programs, running on one or more computers.

FIGS. 2-5 illustrate methods for managing data on survey devices, and/or for synchronizing data between such devices and an office application. While the methods of FIGS. 2-5 are illustrated, for ease of description, as different methods, it should be appreciated that the various techniques and procedures of these methods can be combined in any suitable fashion, and that, in some embodiments, the methods depicted by FIGS. 2-5 can be considered interoperable and/or as portions of a single method. Moreover, while the methods illustrated by FIGS. 2-5 are described with respect to the system 100 of FIG. 1, these methods can be implemented using any suitable hardware implementation. Similarly, while the system 100 of FIG. 1 can operate according to the methods illustrated by FIGS. 2-5 (e.g., by executing instructions embodied on a computer readable medium), the system 100 can also operate according to other modes of operation and/or perform other suitable procedures.

Figure 2:
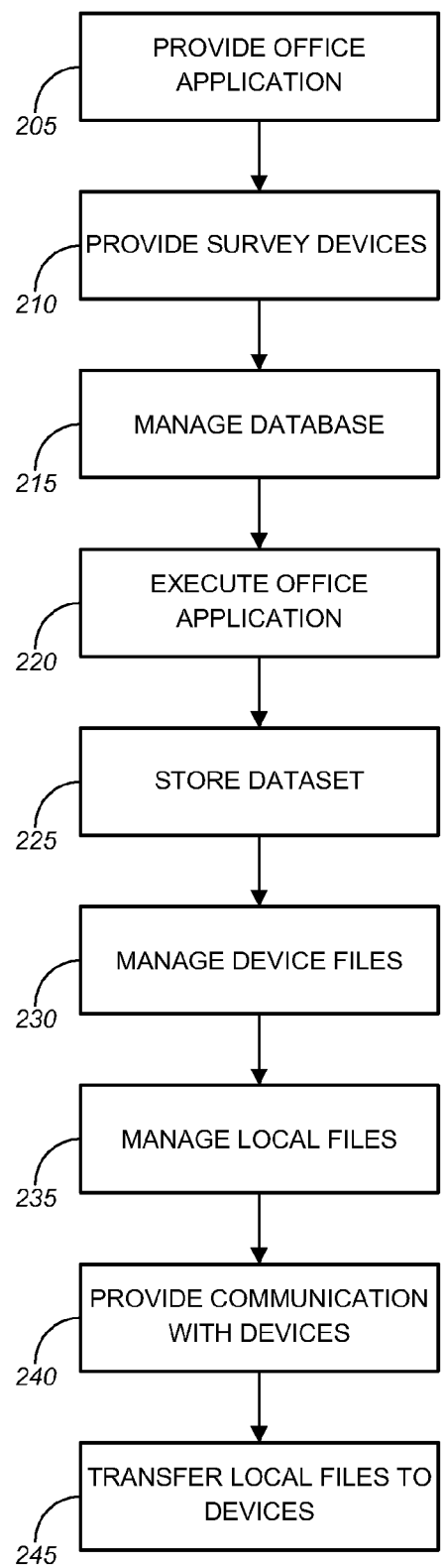
FIG. 2 is a process flow diagram illustrating a method of managing data in a surveying system, in accordance with certain embodiments of the invention.

FIG. 2 illustrates a method 200 of managing data in a surveying system, in accordance with certain embodiments of the invention. The method 200 comprises providing an office application (block 205). Providing an office application can comprise any of a variety of procedures, including without limitation installing an office application (which can include, without limitation, a surveying office application, such as the Trimble Business Center™, to name one example) on a computer system, executing the office application, and/or the like. In a particular embodiment, the surveying office application might allow a user of the computer system to map a location (e.g., a site) associated with the surveying project. Other types of design projects, such as road layout, construction drawings, etc. might also be supported by various office applications.

The method 200 might further include providing one or more survey devices (block 210). As noted above, a survey device can be any device that is capable of measuring, recording and/or storing data, including without limitation survey data. In an aspect, a survey device might have a file system that provides accessibility to one or more files in which data (e.g., measured and/or recorded data) is stored. Notably, in an aspect of some embodiments, the survey device does not need to be configured to interact with the office application—instead, in such embodiments, the techniques of the invention can be used to synchronize data with any device on which files are available for copying and/or replacement. Providing a survey device can comprise any of a variety of procedures, including without limitation installing any necessary software on a survey device, providing survey devices for use by field operators, and/or performing any other techniques necessary to configure a survey device for operation in accordance with various embodiments.

At block 215, the computer system, or more precisely in some cases, the office application, manages a database. In particular embodiments, the database is used for storing surveying data, including without limitation the types of data described above. Managing the database can comprise installing the database on a storage medium, configuring the database for use with the office application, and/or any other configuration and/or maintenance tasks typically associated with database operations. At block 220, the office application is executed on the computer system. The office application, as noted above, may be used for any of a variety of surveying and/or design projects. Merely by way of example, the office application may be used to render a depiction of a site and/or a design model. In an aspect, the office application may store a dataset in the database (block 225). The dataset typically will include some or all of the data (including, for example, reference points, angle measurements, triangle (or other polygon) data, and/or the like) for rendering the depiction of the project.

At block 230, the computer system manages one or more sets of device files. In general, as noted above, each set of device files will correspond to at least a portion of the dataset stored in the database—in other words, each survey device will have stored thereon some or all of the data from the database, albeit often in a different format. In some embodiments, managing the device files comprises tracking, generally in the office application, the anticipated functions (with respect to the project of interest) of each survey device and determining what data is needed for these functions. Merely by way of example, a user might specify that a first survey device will be used to survey a particular portion of a site, or to perform a particular set of measurements, and/or the like, and based on that specification, the office application might determine what data is necessary for that device. Managing the device files, then, might also comprise creating device-specific data files for each device, based on the information about the function of the device within the project, and/or information about specific device requirements or capabilities (e.g., the types of files and/or file formats required for each device). This information might be provided by a user; in other cases, the office application might maintain a database of devices, such that merely by identifying the device (based on user input, automatic device detection, etc.) the office application can determine the appropriate files and/or formats. As noted above, a first set of one or more device files might be stored on a first device, and a second set of one or more device files might be stored on a second device.

In certain embodiments, as noted above, the management of device files might include storing, on a file system accessible by the computer system and/or office application, a set of local files corresponding to each set of device files—in other words, the system, according to such embodiments, will store, in the file system, a set of local files identical (subject to some caveats, as discussed below) to the files stored on each of the survey devices, organized by survey device, as described above with respect to FIG. 1. Hence, managing the device files might further comprise managing these sets of local files (block 235). Management of the local files, in some embodiments, includes establishing, on the file system, a directory structure to organize the local files corresponding to each set of device files. Referring to FIG. 1, for example, the directory structure 135 might include a first directory of local files 145*a* corresponding to device files 130*a* stored (or to be stored) on a first device 125*a*; similarly, other directories may be established within the directory structure 135 to hold local files corresponding to other devices. Managing the local files can also include exporting, from the office application, the appropriate files for each device from the office application's database to the appropriate directories.

At block 240, communication is provided between each of the survey devices and the file system. This communication may be provided using any of a variety of techniques; the appropriate technique generally will depend on the capabilities of the survey devices and/or the system generally. Merely by way of example, if the survey devices have wireless capabilities (e.g., WiFi, cellular, and/or the like), and if the computer system is configured to enable such communication, wireless communication may be provided. Additionally and/or alternatively, network communications may be provided between each of the survey devices and the file system. Merely by way of example, if the file system is accessible by a computer (e.g., the computer system on which the office application executes) on a local area network, the survey devices may be configured to be in communication with the file system via this network, perhaps through one or more intermediary devices, such as wireless gateways, firewalls and/or virtual private networks, and/or the like. It other embodiments, the survey devices may be configured to communicate with the computer system via a local connection, such as an infrared connection, USB connection, serial connection, and/or the like. As noted in further detail below, communications between the file system (and/or, more particularly a computer system managing the file system) and one or more of the wireless devices may be relatively constant and/or may be intermittent.

Upon establishing communication with a particular survey device, the system transfers the local files for that particular device to the device (block 245). (Transferring files can comprise either copying the local files and leaving the local files intact, or moving the local files, such that the local files no longer exist in the file system.) In an aspect, the computer system may be configured to identify each connected survey device, identify the directory that corresponds to that survey device, and transfer the local files from the appropriate directory to the device. If there are no existing files on the device (or, more precisely, no existing files that conflict with the local files being transferred), the local files are simply copied (or moved) to the device. If there are conflicting existing files (e.g., files with the same filenames as the local files, etc.), any existing files might simply be replaced. Alternatively, as described in more detail below, a conflict/data inconsistency resolution procedure might be implemented. (The desired behavior can be set as a default, selected by a user, etc.). At this point, the survey device has been configured with the necessary data, and it can be taken into the field for data collection.

It will be appreciated, based on the disclosure herein, that a survey device often will be used to collect data in the field about reference points that will be used by the office application. In some cases, the office application may establish reference points (and transfer those reference points to a survey device), and the survey device may then collect data about those reference points. In other cases, the reference points may be established on the survey device by a user in the field. In either case, some data generally will be transmitted back from the survey device to the office application. This process creates opportunities for data inconsistencies. Merely by way of example, two survey devices might inadvertently provide the same label for two different reference points that are created in the field. As another example, a user of the office application might change reference points after those reference points have been downloaded to a survey device. It can be seen that other inconsistencies can develop as well. Accordingly, certain embodiments of the invention provide tools for avoiding and/or resolving such inconsistencies.

Figure 3:
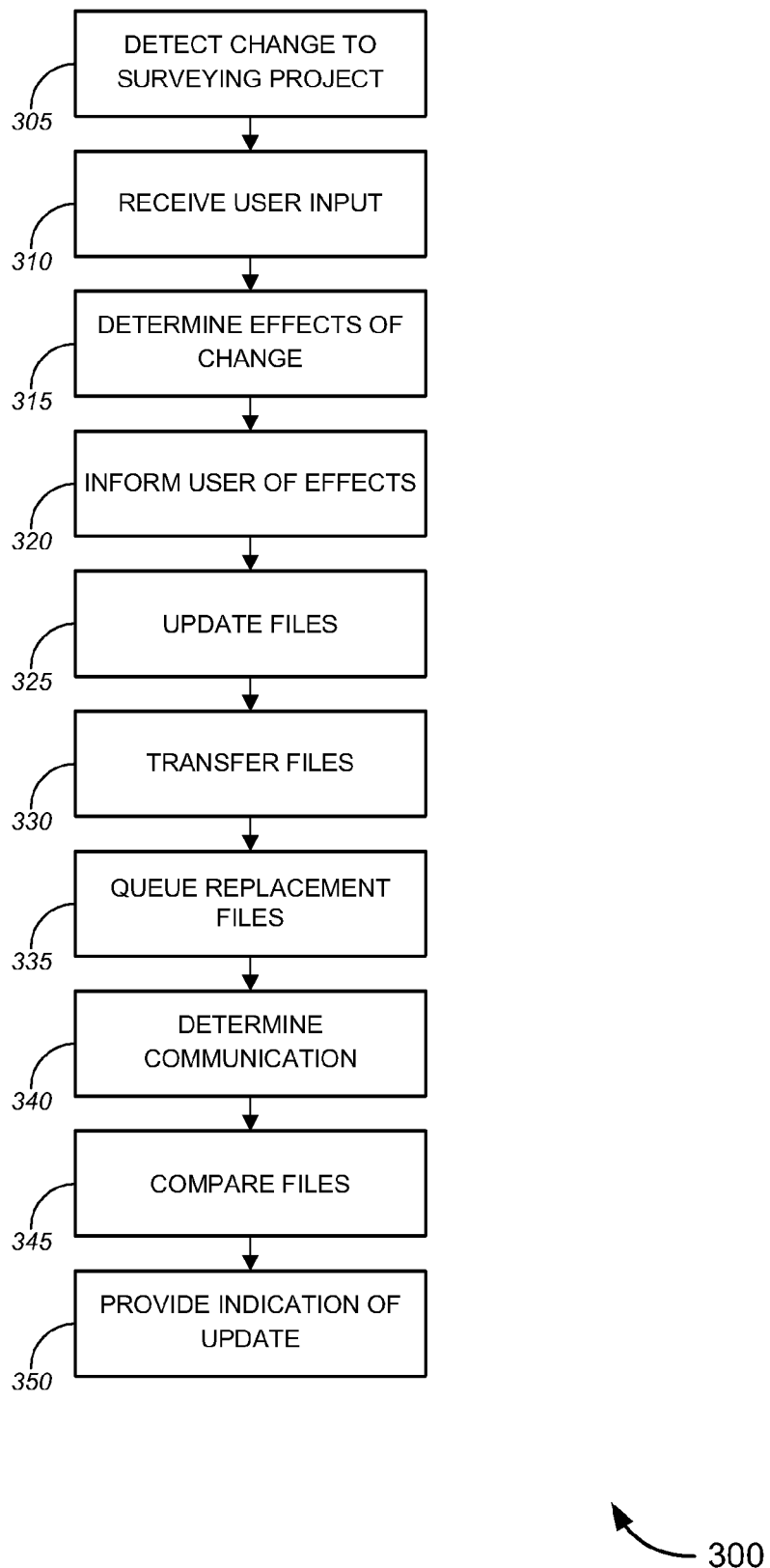
FIG. 3 is a process flow diagram illustrating a method of updating data on a survey device, in accordance with certain embodiments of the invention.

Merely by way of example, FIG. 3 is a process flow diagram illustrating a method 300 of updating data on a survey device, in accordance with certain embodiments of the invention. The method 300 can be used, for example, to ensure that changes made to project data in an office application are properly propagated to the survey devices that are affected by these changes. The method 300 comprises detecting a change to a project in the office application, which might be, for example, a surveying project. In an aspect, the change might comprise a change to some of the data in the dataset stored in the database. Merely by way of example, a user of the office application might provide input through a user interface of the office application. This input might modify the surveying project, for example, by moving a reference point, a design feature, and/or the like. This modification might affect some of the data stored on one or more of the survey devices. Merely by way of example, if a modification of a surveying project modifies one or more reference points corresponding to locations to be mapped by the surveying project, any survey device that will be used to survey an area in which those points are located is likely to be affected by the change.

Accordingly, the method 300 comprises, in some embodiments, determining that the change to the surveying project affects one or more device files. Specifically, in particular embodiments, the system might determine that the change affects one set of device files for one device, but not another set of device files for another device. In an aspect, the office application is able to make this determination because, as noted above, the office application may be configured to track which data is necessary for each device. Hence, the office application may be configured to determine, whenever data in the dataset has been changed, whether that changed data is used by any of the survey devices, and if so, which survey devices use that data. Merely by way of example, a particular change to a project dataset might affect one or more files in a first set of device files for a first device but may not affect any files in a second set of device files for a second device. To illustrate, by reference to FIG. 1, a particular change to a project dataset might affect the data in File 2, which is included in the sets of device files 130a and 130c for survey devices 125a and 125c, respectively, but is not included in the set of device files 130b for survey device 125b.

Figure 6:
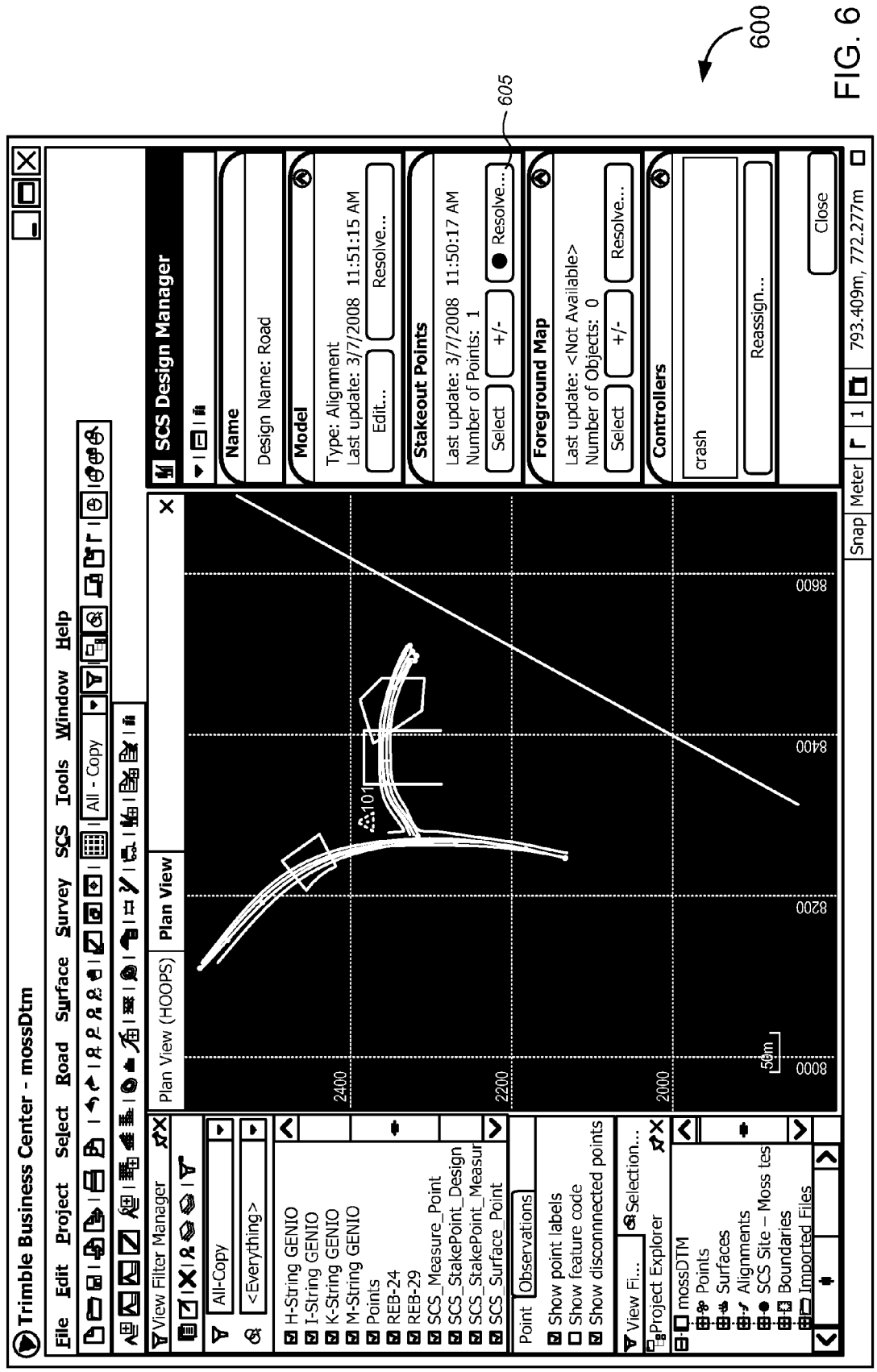
FIGS. 6 and 7 are exemplary screen displays illustrating aspects of a user interface of an office application, in accordance with certain embodiments of the invention.

In some cases, the system may be configured to automatically account for any changes made to the project. In other cases, however, user interaction may be required to account for these changes. In either case, it may be desirable to inform the user of the office application that his/her changes have affected one or more survey devices (block 320). For instance, the office application may be configured, in response to a change to the dataset (e.g., as a result of user input) to display an indication in the office application that one or more of the survey devices need to be updated as a result of the change. Merely by way of example, referring to FIG. 6, a screen display 600 of a user interface of an exemplary office application provides an indication (in the form of a button 605 with a highlighted indicator) to a user that data has changed and that data on one or more devices may need to be updated to resolve inconsistencies created by the change. If desired, the indication might identify the affected survey device(s) by name, etc. By clicking on the button 605, the user may be able to view a list of the affected devices and/or files, and/or instruct the office application to take appropriate actions, including without limitation those described below. (Of course, it should be appreciated that the office application, and/or the computer system more generally, may be configured to take such actions automatically.)

Returning to FIG. 3, upon determining that the change affects one or more files for one or more devices, the computer system (or, more specifically in some cases, the office application) updates the affected files with new data (block 325). In particular embodiments, updating an affected file comprises generating a new replacement file for each affected file; the replacement file typically will include the updated data, in addition to any other unaffected data that originally was in the affected file. The replacement file(s) then may be stored as local files in the file system in the directories appropriate for the devices to which the files correspond. Alternatively, updating a file might comprise modifying an existing local file within the file system. (It should be recognized, of course, that in embodiments that don't employ this local file technique, affected device files may be updated and/or replaced directly on each affected survey device.)

Assuming the local file technique is used, the replacement local files are then transferred to each of the survey devices, as appropriate (block 325). In one aspect, the transfer of local replacement files to each appropriate device is similar to the transfer of local files to devices, as described above with respect to FIG. 2. In some cases, however, as noted above, a survey device may not be in constant communication with the computer system and/or the file system on which the local files are stored. Hence, in some embodiments, the method 300 further comprises queuing the replacement files for transfer to the appropriate devices (block 335). In an aspect, queuing a file for transfer may simply comprise placing a local file in an appropriate directory within the file system, and as noted above, a process may be responsible for transferring files when communications become available. In other aspects, however, queuing files may comprise placing the queued files in a special directory, marking the files as ready for transfer, and/or any other appropriate procedure.

At block 340, the system determines that communications have been established between the file system and a survey device to be updated. Many techniques can be used to make this determination. Merely by way of example, if the survey device is connected by USB or similar connection, the system may automatically identify the survey device as being connected. Alternatively and/or additionally, the survey device may be configured to advertise its presence when in communication with the system, and/or user input may indicate that communication has been established. Other techniques are possible as well. Based on a determination that communication has been established, the appropriate replacement files may be transferred.

While, in some cases, it may be desirable to replace all device files with local files (and especially replacement local files) indiscriminately, in other cases, it may be desirable to ensure that the local file, rather than the device file, has the proper information before replacing the device file. One technique for accomplishing this is by comparing the local file with the device file it is to replace (block 345). Merely by way of example, in some embodiments, the system (or more precisely, the office application and/or a cooperative program for synchronizing data) compares a set of local files with a set of device files on a device to determine that the set of local files include a replacement file, and the set of device files does not include replacement file. Based on this determination, the system determines that at least a portion of the set of device files needs to be updated to include the replacement file. This comparison might include comparison of one or more properties of each of the files in a set of local files and set of device files. Such properties can include, without limitation, the filename of each file, a creation and/or modification date of each file, a version number of each file, and a file size of each file. In particular embodiments, the system may be configured to generate a hash value (such as an MD5 sum) of each file and compare these hash values of each corresponding file.

Upon updating and/or replacing one or more local and/or device files, and/or upon transferring the replacement files to one or more survey devices, the system may be configured to provide an indication to a user that the data on the survey device(s) has been updated (block 350). Merely by way of example, an updated survey device may display an indication for the user of that survey device that the survey device has been updated. Alternatively and/or additionally, the office application may display an indication via its user interface that one or more survey devices have been updated. Optionally, this indication may identify the survey devices that have been updated, and/or may identify any survey devices that do not need to be updated or that need to be updated but have not yet been updated.

Figure 4:
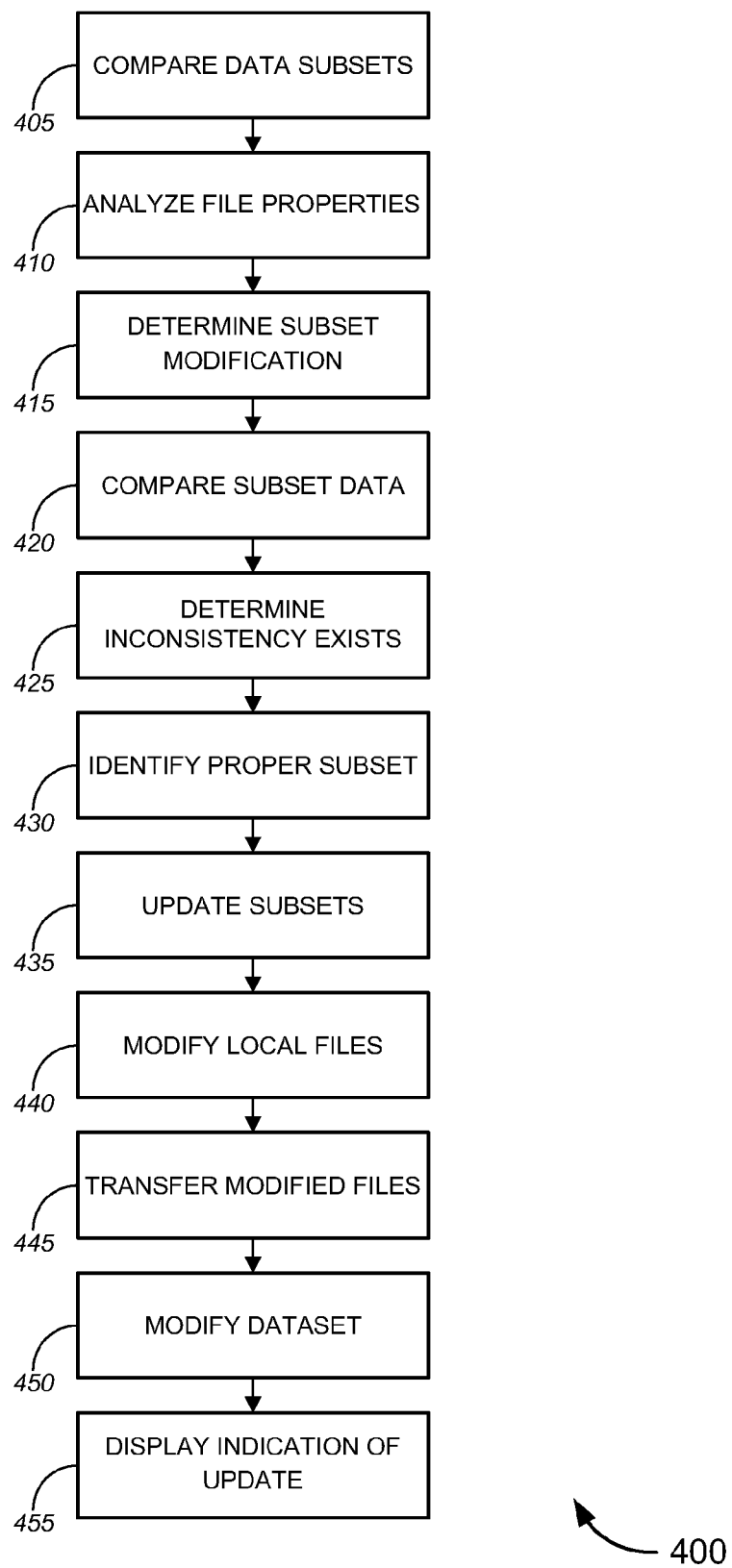
FIG. 4 is a process flow diagram illustrating a method of resolving data inconsistencies in a surveying system, in accordance with certain embodiments of the invention.

While the method 300 of FIG. 3 addresses the situation in which the office application's dataset has been updated, and one or more devices need to be updated correspondingly, it may not address the situation in which data on devices has been updated and/or in which there may be conflicting updates. FIG. 4, therefore, is a process flow diagram illustrating a method 400 that can be used more generally to resolve data inconsistencies in a surveying system, in accordance with certain embodiments of the invention. Merely by way of example, the method 400 can be used in a situation in which both the office application's dataset and one or more sets of device files have been updated independently, a situation in which a set of device files has been updated (perhaps inadvertently), and/or any other situation in which the data on one or more devices is inconsistent with the office application's dataset and/or data on other devices, such as, for example, when two survey devices have a reference point with the same label (name) and different descriptive data. This can occur, for instance, when two survey crews (each with its own survey device) survey the same position but calculate different locations because of atmospheric or setup errors, or in which two survey crews survey different positions but each crew names the resulting reference point with the same label.

In one aspect, the office application's dataset can be considered to comprise multiple subsets of data. Accordingly, a data subset can be considered any set of data that is shared among the office application and one or more devices and is indivisible for purposes of resolving a data conflict. Depending on implementation, the granularity with which a data subset is defined can vary. Merely by way of example, the entire set of data necessary for a particular survey device can be considered, in some embodiments, a data subset. As another example, the data describing a particular reference point, a particular area of a project site, and/or the like can be considered a data subset. Hence, each of the survey devices will have stored thereon one or more data subsets, embodied by one or more device files on each survey device. (Note that, for purposes of this disclosure, it should not be assumed that there is a one-to-one correlation between data subsets and device files, although this may be the case in some instances. In other words, a single data subset may be embodied by more than one device file on a particular device; similarly, a single device file may comprise multiple data subsets.)

In accordance with the method 400, the system compares a first subset of the data in the dataset with a second subset of data in a first set of device files (which, as noted above, are stored on a first survey device) to identify any inconsistencies in the data subsets. Optionally, the comparison can involve more than one set of device files, such that data subsets on two (or more) devices can be compared against each other, and/or the corresponding data subset of the office application's dataset, simultaneously. As noted above, by nature of certain embodiments, any two given survey devices may have different data sets, if they are used for different purposes/locations within the same project. For purposes of this comparison, however, it is assumed that corresponding data subsets on different devices to be compared should be consistent (e.g., that they should have data descriptive of the same reference points, locations, etc.); in an aspect, the system may be configured to disregard different data subsets that may be on various devices, and only to compare those subsets that are supposed to be consistent with each other. (For example, by reference to FIG. 1, the system might compare File 1 on each of the devices 125a, 125b and 125c for consistency, but it would not attempt to ensure consistency between the data in File 2 on device 125a and any data on device 125b, since device 125b does not have File 2.)

It should be noted that this comparison can be performed directly with the device files, or alternatively, with local files corresponding to device files (i.e., with the local files acting as a proxy for the corresponding device files). In the latter case, the device files may be transferred to the file system (where they might replace the corresponding local files), such that the local files for a particular device are updated with information from the device files, rather than the converse, which is described in accordance with the method 200 described above. Alternatively, the local files might be considered a proxy for the office application's dataset, such that comparing the dataset with the device files comprises comparing the local files with their corresponding device files. In another alternative, the office application may export a "master set" of local files when producing device-specific updates; this master set of local files then can be compared with device-specific local files. Any of these techniques, as well as others, may be used in accordance with various embodiments of the invention to compare a dataset with one or more sets of device files.

In some embodiments, comparing data subsets comprises analyzing properties of one or more files (corresponding to the data subsets being compared) in one or more sets of device files and/or local files (block 410). The properties of the files to be analyzed, and the techniques for analyzing the properties, may be similar to those described above. Merely by way of example, if it is known that the data subset from the office application's dataset was last modified at a particular date and time, the date/time stamps of the device files of the corresponding data subsets on the devices can be analyzed to determine whether their modifications are newer, older, or the same age as the modifications of corresponding subset of the office application's data set (the date/time of modifications to the dataset's subset can be determined, in various embodiments, by metadata stored in the database, by reference to modification dates on a set of local files—perhaps a master set, if the device-specific local files are used as a proxy for the device files, as described above—and/or the like). Similarly, file sizes, hash values, file versions, and/or the like can be used to compare different data subsets to determine whether the subsets have consistent data.

If the analysis of file properties indicates that one or more of the files has been modified, or that the dataset in the database has been modified more recently than the device files, it can be determined, based on this analysis, that one of the data subsets has been modified (block 415). (If not, it may not be necessary to perform any further data reconciliation procedures). In some cases, if the device file itself is the data set (for example, if the device file is a DXF file or some other type of file that is not easily amenable to parsing), any differences in the file properties may be considered a data inconsistency. If so, the fact that the files are not consistent can be sufficient to determine that a subset data inconsistency exists, and that one (or more of the data subsets) needs to be updated or replaced, as described in further detail below.

However, in some cases, the inconsistency can be analyzed with finer granularity. Merely by way of example, if the compared files are text files that contain reference point data, the contents of the files themselves (i.e., the data within each subset) can be compared against corresponding data from other files and/or with the data in the office application's dataset (block 420). For example, if a file comprises data about five hundred different reference points, the data about only one reference point may be inconsistent among the datasets—the other data within the files might remain entirely consistent.

Based on a comparison of the respective data subsets (either a gross comparison of the files themselves, or a comparison of specific data within the files), it is determined that a data inconsistency exists between two or more of the subsets (block 425). To resolve this inconsistency, a proper subset (i.e., the subset with the correct data) can be identified (block 430). In some cases, this identification can be performed automatically, based on various business rules. For instance, a business rule might specify that the most recently-updated subset should be considered the proper subset. Alternatively, a business rule might specify that the office application's dataset should always control, and that any variance in the subsets of the device files should be presumed to be incorrect. Conversely, a business rule might specify that a particular device's data should control. In some embodiments, these business rules may be specified within the office application, to accommodate implementation-specific conditions or the desires of a user.

Figure 5:
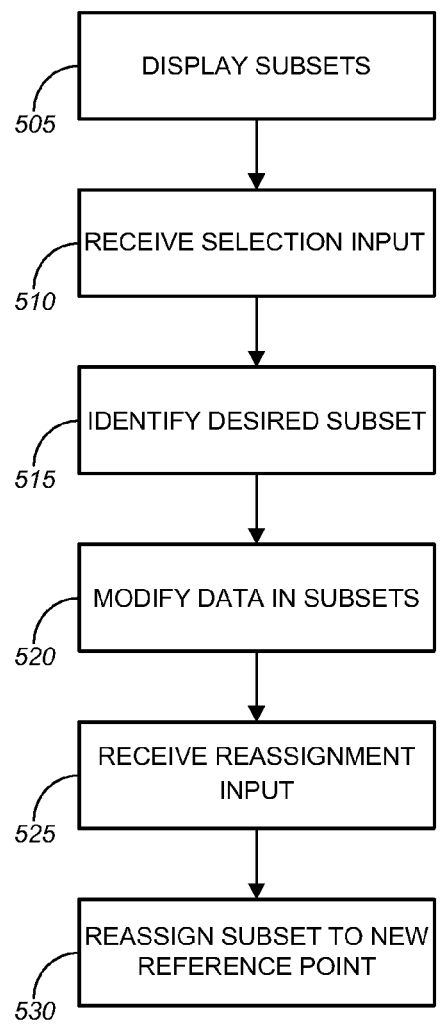
FIG. 5 is a process flow diagram illustrating a method identifying a proper data subset in a surveying system, in accordance with certain embodiments of the invention.
Figure 7:
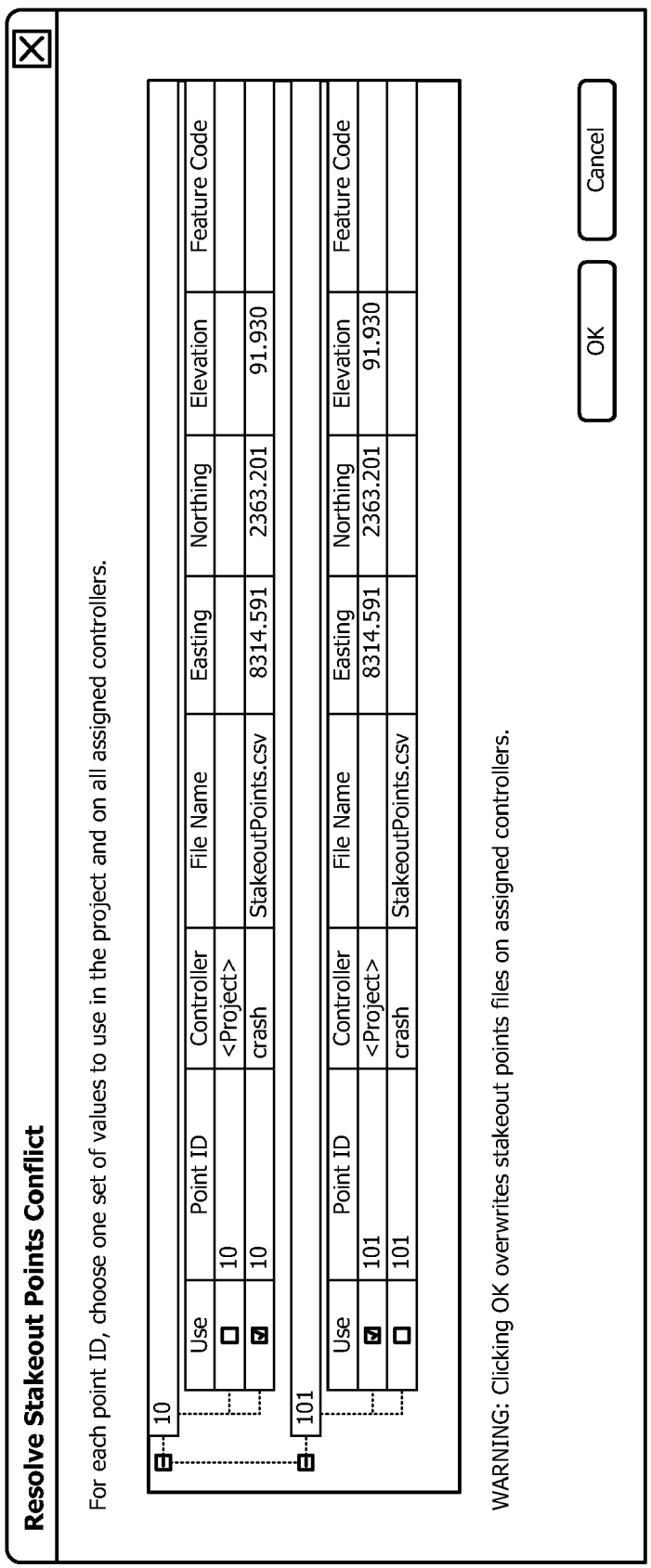

In other cases, it might be more appropriate to allow a user to provide input to determine which data subset has the proper data. FIG. 5 illustrates a method 500 for identifying a proper data subset, in accordance with one set of embodiments. In accordance with the method 500, each of the data subsets (and/or the conflicting data within those subsets) may be displayed for a user (block 505). Merely by way of example, FIG. 7 illustrates a screen display 700, from a user interface of an office application, which displays data from two different subsets. In the illustrated embodiment, the data subsets are taken from the office application's dataset (labeled "<Project>") and from a survey device named "crash." The conflict, in this case, is that the same surveyed location (as indicated by the location-descriptive data) is assigned one label in the office application's dataset and another label in the survey device's data subset. The user, then, is given the option to select which of the two subsets has the correct data.

Returning to FIG. 5, the method comprises receiving, e.g., via a user interface of the office application, input from a user to select a desired subset as the proper subset (block 510). Based on the user's input, the selected subset is identified by the system as the proper subset (block 515). If specific data within a subset is selected, in this manner, as the proper data, the data within other, conflicting subsets may be modified appropriately (block 520), for example, by automatic modification of the office application's dataset and/or the conflicting device files (and/or their local file proxies).

In some cases, as in the case of a reference point conflict (e.g., where the same reference point label is used to refer to two different surveyed locations), the user might also be given the opportunity to reassign one set of conflicting data to a second reference point (label), thereby resolving the conflict (block 525). The method 500, then, might comprise reassigning the identified subset data to the second reference point (block 530). (In this case, the proper subset is also updated with the new reference point information.)

Returning to FIG. 4, once a proper data subset has been identified, the other, conflicting subsets are updated to be consistent with the proper subset (block 435), thereby resolving the inconsistency within the subsets. Depending on the nature of the data subset, the updating procedures might comprise modification of a file (as described with respect to block 520, above, for example), or by replacement of one or more files (as in the case, for example, where the file is not amenable to parsing in order to compare data within the file—in this case, the file itself can be considered the entire data subset).

Hence, the method 400 may comprise modifying/replacing any device files as necessary. As noted above, in some cases, device files can be modified and/or replaced by modifying and/or replacing local files stored in the file system (block 440) and then transferring these modified/replaced local files to their corresponding devices (block 445), e.g., using the techniques described above. Similarly, if necessary, the method 400 can include modifying the office application's dataset (in the database) with data corresponding to the proper data subset (block 450). In some cases, the method 400 also includes displaying, for a user, an indication that one or more of the subsets have been updated, perhaps in a fashion similar to that described with respect to block 350 above.

Figure 8:
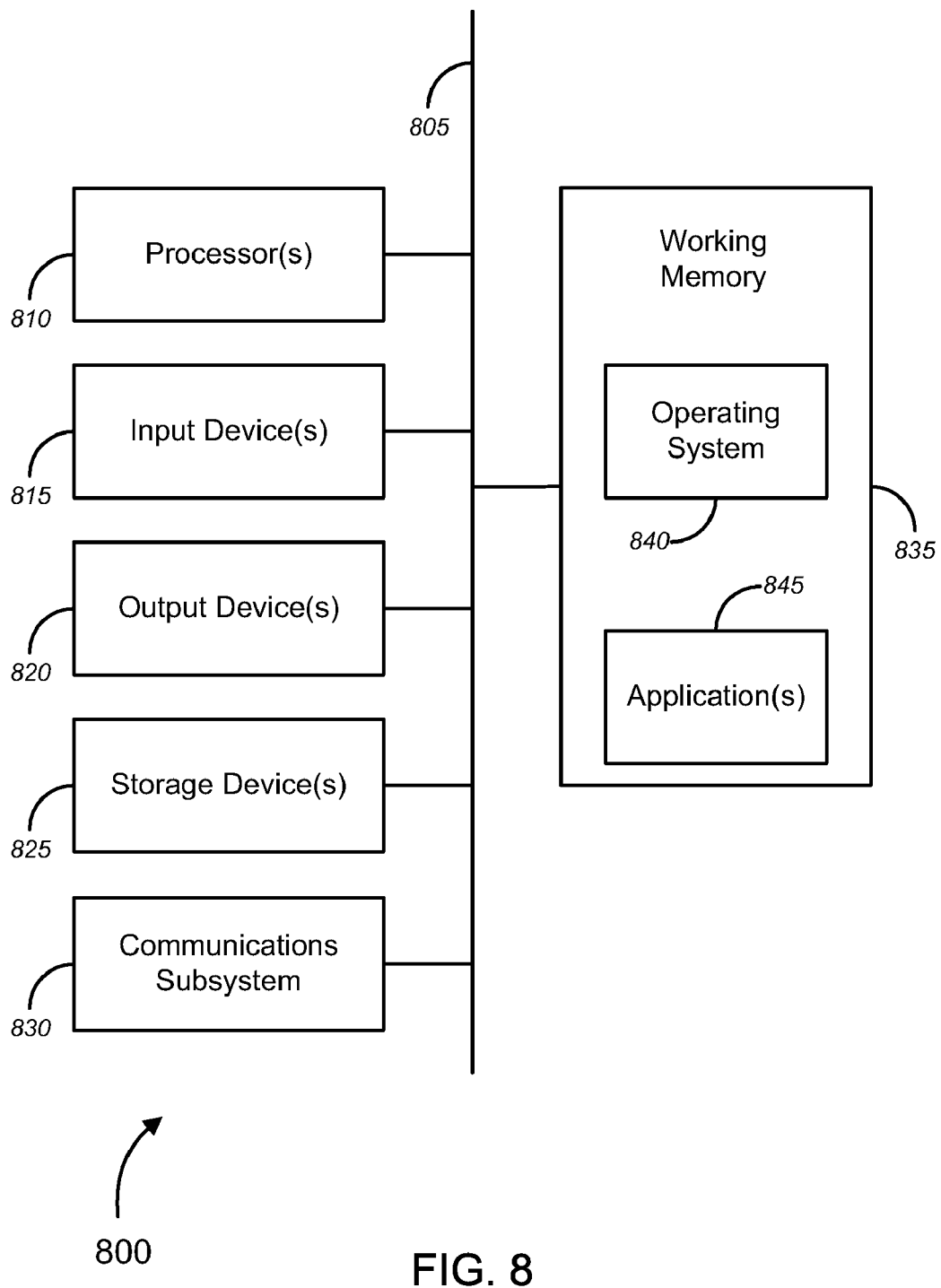
FIG. 8 is a generalized schematic diagram illustrating a computer system, in accordance with various embodiments of the invention.

FIG. 8 provides a schematic illustration of one embodiment of a computer system 800 that can perform the methods provided by various other embodiments, as described herein, and/or can function as the computer system 105 and/or the survey devices 125 described above. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operation in a specific fashion. In an embodiment implemented using the computer system 800, various computer readable media might be involved in providing instructions/code to processor(s) 810 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 825. Volatile media includes, without limitation, dynamic memory, such as the working memory 835. Transmission media includes, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
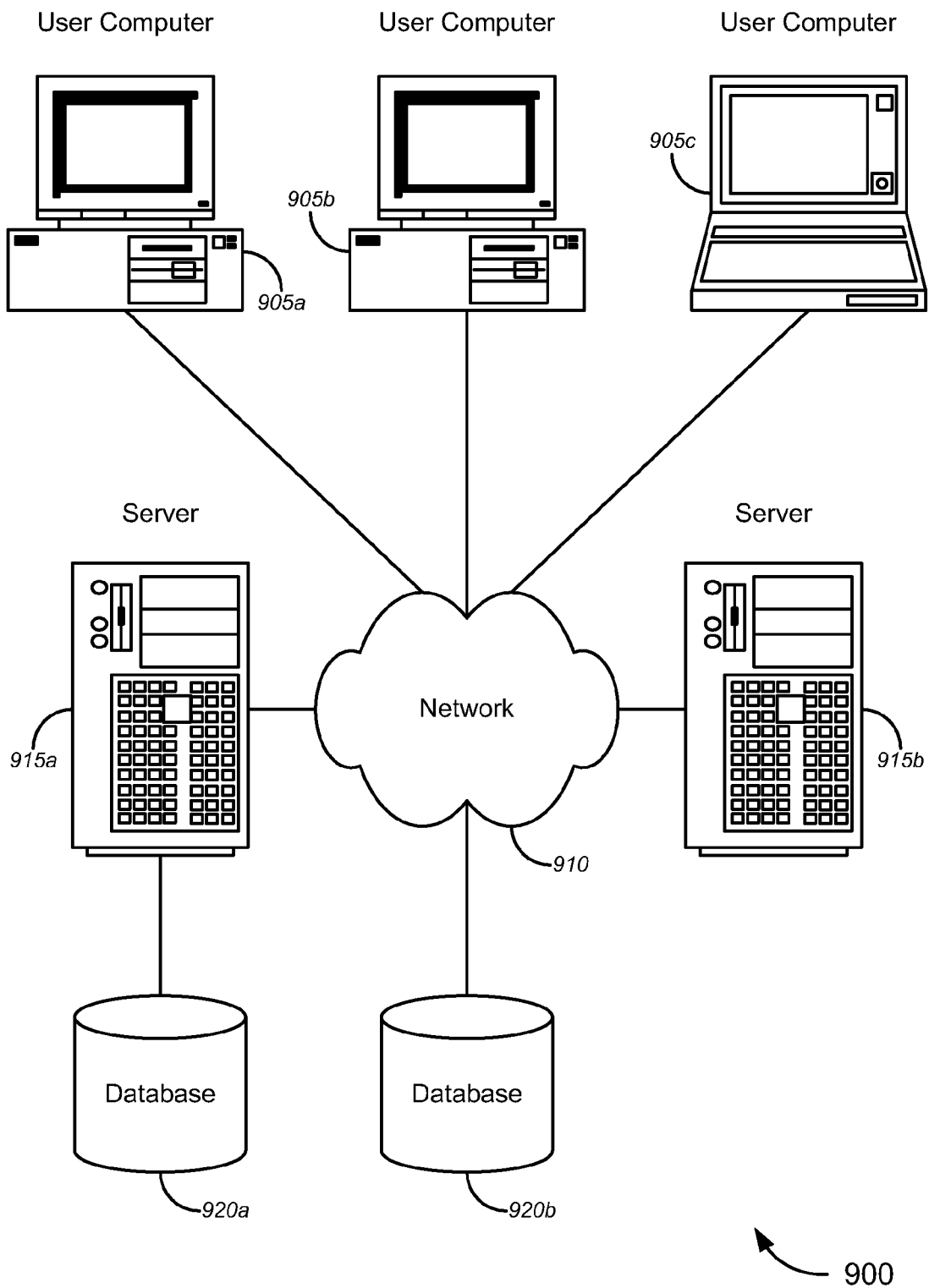
FIG. 9 is a block diagram illustrating a networked system of computers, which can be used in accordance with various embodiments of the invention.

A set of embodiments comprises systems for synchronizing data among office applications and survey devices, as described above. FIG. 9 illustrates a schematic diagram of a system architecture 900 that can be used (e.g., to perform the functions of the system 100 described above) in accordance with one set of embodiments. The system 900 can include one or more user computers 905. In one aspect, a survey device, as described above, can serve as a user computer. In another aspect, a user computer 905 can be used to access, e.g., via a web interface, client-server architecture, etc., an office application running on a server computer.

Hence, in some respects, a user computer may be a special-purpose device for collecting and/or recording data. In another respect, however, a user computer 905 can be a general purpose personal computer (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 905 can also have any of a variety of applications, including one or more applications configured to perform methods provided by various embodiments (as described above, for example), as well as one or more office applications, database client and/or server applications, and/or web browser applications. Alternatively, the user computers 905 can be any other electronic device, such as a thin-client computer, Internet-enabled mobile telephone, and/or personal digital assistant, capable of communicating via a network (e.g., the network 910 described below) and/or displaying and navigating web pages or other types of electronic documents. Although the exemplary system 900 is shown with three user computers 905, any number of user computers can be supported.

Certain embodiments of the invention operate in a networked environment, which can include a network 910. The network 910 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 910 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system, including without limitation any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 may be a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications (such as office applications) accessible by a client running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 905 and/or another server 915. In some embodiments, an application server can create web pages dynamically for displaying the information in accordance with various embodiments, such as for displaying a user interface of an office application. Data provided by an application server may be formatted as one or more web pages (comprising HTML, Javascript, etc., for example) and/or may be forwarded to a user computer 905 via a web server (as described above, for example). Similarly, a web server might receive web page requests and/or input data from a user computer 905 and/or forward the web page requests and/or input data to an application server. In some cases a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920*a* might reside on a storage medium local to (and/or resident in) a server 915*a* (and/or a user computer 905). Alternatively, a database 920*b* can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 935 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An apparatus, comprising:
   a non-transitory computer readable medium having encoded thereon a set of instructions executable by a computer system to perform operations, the set of instructions comprising:
   instructions for managing a database for storing surveying data;
   instructions for storing, in the database, a dataset about a surveying project;
   instructions for managing a plurality of sets of files stored in a file system accessible by the computer system, each set of files corresponding to at least a portion of the dataset, the plurality of sets of files comprising a first set of files and a second set of files;
   instructions for transferring the first set of files to a first survey device;
   instructions for transferring the second set of files to a second survey device;
   instructions for detecting a change to the surveying project, the change causing a change to some of the data in the dataset;
   instructions for determining that the change to the surveying project affects at least one file in the first set of files but does not affect any files in the second set of files;
   instructions for comparing the first set of files in the file system with a set of device files on the first survey device to determine that the first set of files comprises the replacement file and that the set of device files does not comprise the replacement file, and based on a determination that the first set of files comprises the replacement file and that the set of device files does not comprise the replacement file, determining that at least a portion of the set of device files needs to be updated to include the replacement file;
   instructions for updating the at least one file in the first set of files with a replacement file; and
   instructions for transferring the replacement file to the first survey device.

2. A method of providing consistent data across a plurality of survey devices comprising:
   managing a database which stores surveying data with information from surveying projects;
   managing a plurality of sets of files stored in a file system accessible by a computer system, each set of files corresponding to at least a portion of the surveying data, the plurality of sets of files comprising a first set of files and a second set of files;
   transferring the first set of files to a first survey device;
   transferring the second set of files to a second survey device;
   detecting a change to the surveying project which change includes a change to some of the data in the database;
   determining that the change to the surveying project affects at least one file in the first set of files, but does not affect any files in the second set of files;
   comparing the first set of files in the file system with a set of device files on the first survey device to determine that the first set of files comprises the replacement file and that the set of device files does not comprise the replacement file, and based on a determination that the first set of files comprises the replacement file and that the set of device files does not comprise the replacement file, determining that at least a portion of the set of device files needs to be updated to include the replacement file;
   replacing the at least one file in the first set of files with a replacement file containing data indicative of the change in the surveying project; and
   transferring the replacement file to the first survey device.

3. The method of claim 2, further comprising:
   providing an indication to a user that data on the first survey device has been updated.

4. The method of claim 3, wherein providing an indication to a user comprises displaying the indication on the first survey device.

5. The method of claim 3, wherein providing an indication to a user comprises displaying the indication to a user of a surveying office application on the computer system.

6. The method of claim 2, wherein the surveying data comprises a plurality of reference points corresponding to locations mapped by the surveying project, and wherein the change to the surveying project comprises a change to a reference point.

7. The method of claim 6, wherein the first survey device is used to survey an area comprising the reference point.

8. The method of claim 2, wherein the first survey device comprises a global positioning system ("GPS") receiver.

9. The method of claim 2, wherein managing a database comprises executing a surveying office application that allows a user of the computer system to map a location associated with the surveying project.

10. The method of claim 9, wherein detecting a change to the surveying project comprises receiving input data from the user, the input data indicative of the change to the surveying project.

11. The method of claim 10, further comprising in response to the input data from the user, displaying an indication in the surveying office application that one or more survey devices need to be updated.

12. The method of claim 11, wherein the indication identifies the first survey device as a device that needs to be updated.

13. The method of claim 2, wherein transferring at least the replacement file to the first survey device comprises copying the replacement file from the file system to the first survey device but not removing the replacement file from the file system.

14. The method of claim 2, wherein the first survey device is in communication with the file system only intermittently, and wherein transferring at least the replacement file to the first survey device comprises:
   queuing the replacement file for updating;
   determining that communication has been established between the first survey device and the file system; and
   based on a determination that communication has been established between the first survey device and the file system, transferring the replacement file from the file system to the first survey device.

15. The method of claim 2, wherein the first survey device is in wireless communication with the file system, and wherein transferring at least the replacement file from the file system to the first survey device comprises transferring at least the replacement file via wireless communication.

16. The method of claim 2, wherein comparing the first set of files in the file system with the set of one or more device files on the first survey device comprises comparing at least one property of each of the files in the first set files with properties of corresponding files in the set of device files.

17. The method of claim 16, wherein each of the properties are selected from the group consisting of a filename, a file creation date, a file modification date, a file version number, a file size, and a hash value.

18. The method of claim 2, wherein the set of device files on the first survey device comprises text files defining reference points, drawing interchange format ("DXF") files, and triangle files.

19. A computer system comprising:
   a processor;
   a communication interface coupled to the processor; and
   a non-transitory computer readable medium in communication with the processor, the computer readable medium having encoded thereon a set of instructions executable by the computer system to perform operations, the set of instructions comprising:
      instructions for managing a database in which survey data is stored;
      instructions for managing a plurality of sets of files stored in a file system accessible by the computer system, each set of files corresponding to a portion of the database, the plurality of sets of files comprising a first set of files and a second set files;
      instructions for transferring the first set of files to a first survey device;
      instructions for transferring the second set of files to a second survey device;
      instructions for detecting a change to the survey data;
      instructions for determining that the change to the survey data affects the first set files, but does not affect the second set of files;
      instructions for comparing the first set of files in the file system with a set of device files on the first survey device to determine that the first set of files comprises the replacement file and that the set of device files does not comprise the replacement file, and based on a determination that the first set of files comprises the replacement file and that the set of device files does not comprise the replacement file, determining that at least a portion of the set of device files needs to be updated to include the replacement file;
      instructions for updating in the file system the first set of files with a replacement file that reflects the change to the survey data; and
      instructions for transferring the replacement file to the first survey device.

\* \* \* \* \*